United States Patent [19]

Schmidt

[11] 4,026,271

[45] May 31, 1977

[54] SOLAR COLLECTOR COATING

[75] Inventor: Ference J. Schmidt, Ardmore, Pa.

[73] Assignee: Ametek, Inc., Paoli, Pa.

[22] Filed: May 19, 1976

[21] Appl. No.: 687,689

[52] U.S. Cl. .................................. 126/271; 357/10; 204/40; 428/462; 428/620

[51] Int. Cl.² ...................... F24J 3/02; F28F 21/00

[58] Field of Search ................. 126/270, 271, 400; 237/1 A; 29/180 R; 357/10

[56] References Cited

UNITED STATES PATENTS

| 2,917,817 | 12/1959 | Tabor | 29/180 R |
| 3,000,375 | 9/1961 | Golay | 126/270 |
| 3,920,413 | 11/1975 | Lowery | 126/270 X |
| 3,958,554 | 5/1976 | Schmidt | 126/271 |

Primary Examiner—Kenneth W. Sprague
Assistant Examiner—James C. Yeung
Attorney, Agent, or Firm—Amster & Rothstein

[57] ABSTRACT

A solar heat collector including a panel having a coating of $PbO_2$ electrodeposited from a tartrate bath and a second coating of oxygen-deficient $PbO_2$, such as $\alpha$-$PbO_2$ or $\beta$-$PbO_2$, heat being absorbable thereby and transferable to a liquid or gas for operating heating or cooling system.

6 Claims, 2 Drawing Figures

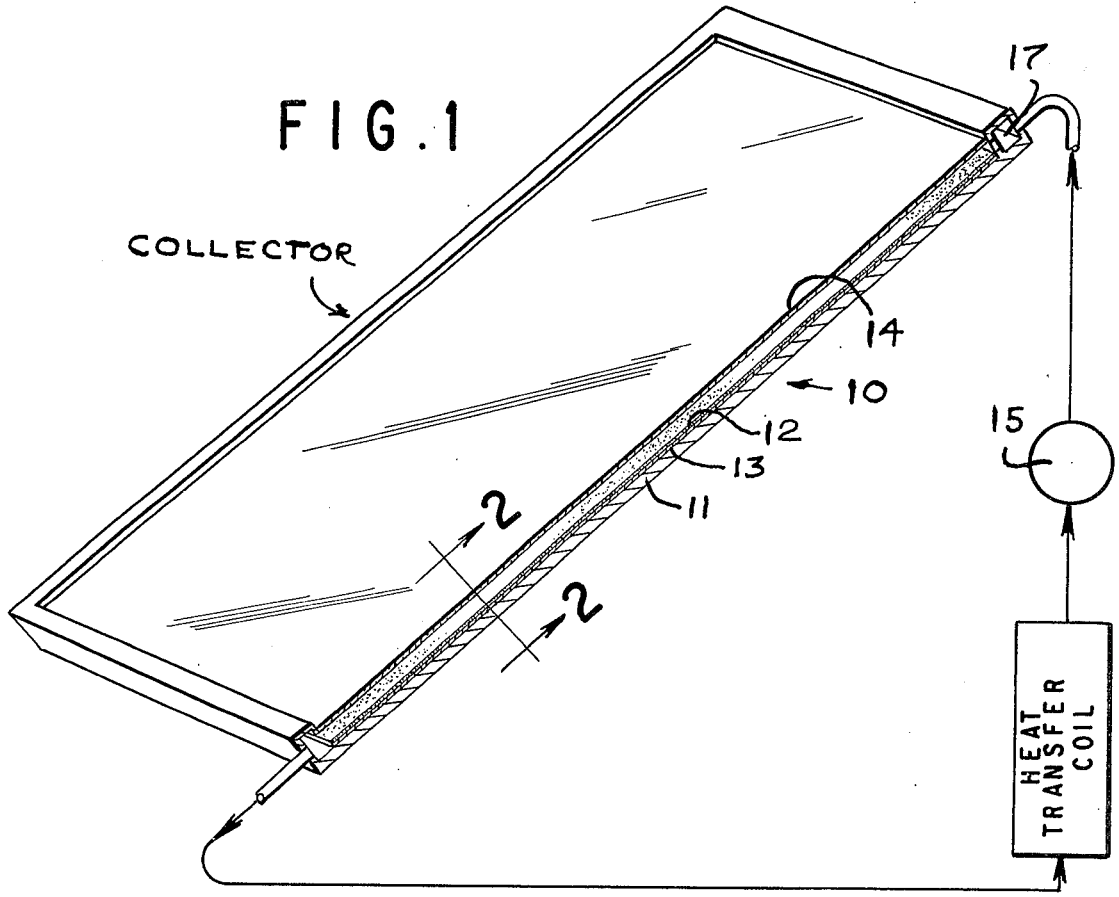
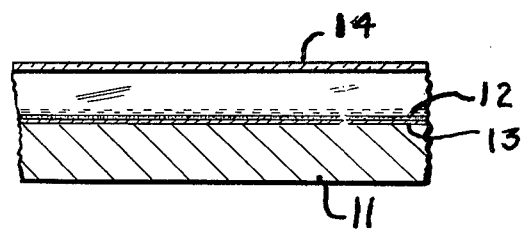

SOLAR COLLECTOR COATING

This invention relates to solar heat collectors and particularly to coatings for improving solar heat collection. This invention is an improvement on applicant's copending application Ser. No. 485,246, filed July 2, 1974, to issue as U.S. Pat. No. 3,958,554 on May 25, 1976.

The heating and cooling of houses by use of solar energy is well known, examples thereof being shown in U.S. Pat. Nos. 3,145,707; 3,215,134; 3,295,591; and 3,236,294. The collectors involve a tube or panel which absorbs the incident solar radiation and heats a fluid circulating thereby. One of the problems involved in some installations is prevention of corrosion, particularly in the presence of moisture. Some attempts have been made to alleviate the same by introducing desiccants into collector frames or by other means, but these have not always been satisfactory.

One of the objects of the invention is to provide an improved heat collector for solar energy devices.

In one aspect of the invention, the solar collector panel or heat transfer member has a first coating electrodeposited thereon from a bath containing tartrate, the first coating being shiny black and substantially continuous so as to provide a protective seal. A second coating is placed over said first coating by electrodeposition from a non-tartrate bath, said second coating having the required optical properties. The second coating is an oxygen-deficient $PbO_2$, such as $\alpha$-$PbO_2$ or $\beta$-$PbO_2$. The heat transfer member can be a flat or corrugated panel or can be tubes.

Other objects, advantages and features of the invention will become apparent from the following description and drawings which are merely exemplary.

In the drawings:

FIG. 1 schematically shows a solar energy collector and system, the collector being in section; and FIG. 2 is an enlarged section of the panel schematically depicting the coatings in enlarged and exaggerated form.

As schematically shown, solar collector 10 may comprise a collector plate 11. The first coating is indicated at 12 and the second coating at 13. The collector can have a transparent glass or other material cover 14 thereon. The fluid, such as a gas or a liquid, to be heated for use in the heating or cooling system is pumped by fan or pump 15 from the heating or heat transfer coil 16 to the header 17 where it is distributed over plate 11 and then returned to the heat transfer coil or means 16. The particular system can take various forms, such as seen in some of the aforementioned patents.

The "black" coatings of the panel are of the most importance inasmuch as such determine the two most important parameters of the collector.

The solar absorptivity, or $\alpha$ value, should be as high as possible, the limit thereof being that of a theoretical black body or 100%. The $\alpha$ is measured at the solar spectrum which peaks at 0.5 micron wave length.

The emissivity, or $\epsilon$ value, is the reradiated heat loss which should be as low as possible. $\epsilon$ is measured at the collector temperature or for 220° F. at around 8 microns wave length.

According to the Stefan-Boltzmann law, $\epsilon$ increases with temperature until an equilibrium temperature is reached where the reradiated energy equals the absorbed solar energy.

The equilibrium temperatures corresponding to various $\alpha/\epsilon$ ratios, $\alpha/\epsilon$ being surface properties, are shown in the following table.

TABLE I

| Equilibrium temperatures of flat plates (approximate values) | |
|---|---|
| $\alpha/\epsilon$ | $O_F$ |
| 6.0 | 470 |
| 5.0 | 430 |
| 2.0 | 250 |
| 1.0 | 135 |
| 0.5 | 40 |
| 0.2 | −60 |

Typical $\alpha/\epsilon$ representation values for groups of materials are shown in the following table.

TABLE II

|  | $\alpha$ | $\epsilon$ | $\alpha/\epsilon$ |
|---|---|---|---|
| Al, freshly evap. | .10 | .025 | 4 |
| Au | .16 | .02 | 8 |
| Ag | .07 | .01 | 7 |
| Ta | .59 | .02 | 29 |
| $Al_2O_3$ | .16 | .75 | .21 |
| Lampblack | .99 | .97 | 1 |
| White paint, 1 mil. | .15 | .94 | .16 |
| Black paint, 1 mil. | .97 | .94 | 1.03 |
| Clear varnish on Al 1 mil. | .20 | .80 | .25 |
| Clear varnish on Al .24 mil. | .20 | .10 | 2.0 |

As set forth in U.S. Pat. No. 3,958,554, by using a coating of $\beta$-$PbO_{1.98}$ on the collector plate, decidedly improved solar collection is obtained. Such a coating is infrared transparent, i.e., has a low $\epsilon$, and is dark gray in the solar or visible range. The $\alpha$ was measured to be about 90%, the $\epsilon$ about 0.15 and the ratio of $\alpha/\epsilon$ to be 6. Such is very much in contrast to the values for other substances shown in the preceding tables. It is seen therein that some material, such as bare metals, have good $\alpha/\epsilon$ ratios, but the absolute value for $\alpha$ is low so that most of the incident energy is reflected ($1-\alpha$) and only a small portion (the $\alpha$) is absorbed which results in a very low efficiency. Black paints or organic coatings in general have high $\alpha$ values but the ratio $\alpha/\epsilon$ is not much above unity so that they remain cool.

The collector surface can be plated by electrodeposition to obtain a semiconductor-type $PbO_2$. At a $O_2/Pb$ ratio of 1.98, coating is an oxygen-deficient, n-type metal oxide with high electron mobility which is several orders higher than for other oxides of this type, e.g., $ZnO$, $In_2O_3$ or $SnO_2$.

One manner of applying the aforementioned $\beta$-$PbO_{1.98}$ coating is as follows:

Plating bath composition: 0.6 mol/liter (or 200 g/lit) of lead nitrate, obtained by dissolving 135 g lead monoxide in 79 cc of nitric acid, s.g. 1415, water was added to bring volume to 1 liter, and 1.5 gr wetting agent (Tergitol, nonionic) and 5 gr copper nitrate (later is used to plate out on the cathode, instead of lead, to conserve the lead in the bath.) "Tergitol" is the trademark of Union Carbide Corp. for its brand of surface active agents. Beta-lead dioxide deposited on the anode under the following strict conditions:

pH = 1 (range 0.5 to a maximum of 2)

Temperature − 75° C. (range 60° to boiling)

Copper plate cathodes were used. The workpiece was the anode. Agitation.

Current density (critical, 10–20 amps/sq. foot on the anode.) Above 20 asf. the stresses crack up the coating. Below 10 asf. there was no uniform plating. Optimum C.D. was 17 asf. The thickness of the coating after 20 minutes was 0.0003 in.

Other oxygen-deficient lead dioxides or semiconductor-type material lead dioxides can be used.

As a further example, an $\alpha$-$PbO_{1.94}$ coating was obtained by applying a coating as follows:

Plating bath composition: NaOH 50 g/lit, lead monoxide 50 g/lit, water added to bring the volume to 1 liter, 41.5 g/lit wetting agent, such as "Tergitol" nonionic. The PbO is in excess because only about 1.8% lead goes into the solution.

The foregoing plates out in the optimum range of 3 to 10 amps. per square foot over a copper anode a full greyish black coating, having 98 to 99.5% absorptivity for the sunlight, and an infrared emissivity (i.e. heat loss), at 220° F., of approximately 20%. Those values are quite independent of the coating thickness, current density or temperature of plating, i.e. a 2 minute plating yields about the same values as a 120 minute plating at any permissible temperature or current density.

However, under very high magnification, 15,000 to 30,000 times, the pictures show that the coating is discontinuous, the individual lead dioxide crystals grow out of the copper base and are not joined or fused together. This explains the poor corrosion protective quality of the coating under some circumstances. A 6 to 12 hour humidity test or immersion in water caused corrosion of the copper base to occur, and the green, blue copper salts diffuse to the surface resulting in a lowering of the absorptivity and an elevation of the emissivity values, which is highly undesirable. Collectors manufactured in this manner must be kept in a sealed, moisture free environment by introducing desiccants into the collector frames or by other means.

In order to meet this problem, where it occurs, it was ascertained that the addition of tartrates, such as sodium-potassium tartrate, to the solution complexes the lead salts to form lead tartrates and several times more lead will go into solution. Platings produced from such a solution are shiny black and show a steady increase of both the absorptance and emittance with thickness, e.g., at 5 amps per square foot from a 50 g NaOH, 50 g PbO, 50 g tartrate solution at room temperature, the following data are measured:

| TIME OF DEPOSITION MINUTES | ABSORPTANCE (Absorptivity) $\alpha$ | EMITTANCE (Emissivity) $\epsilon$ |
|---|---|---|
| 2 | 68% | 18% |
| 5 | 78% | 40% |
| 10 | 87% | 68% |

The highest absorptance obtained was 90%. Those plates, from a room temperature bath, still showed a small amount of discontinuities, but when plated from a bath temperature of 50° C. or higher, no more discontinuities were evident and corrosion attack was not noticed even after 48 hours immersion in water.

Stoichiometric bath composition is not essential, as long as over 4% lead is maintained in the solution.

Thus, the copper panel was coated first with lead dioxide from a tartrate containing bath to provide a corrosion protective seal over the copper or other material, followed by a top coat from a non-tartrate bath to provide the required optical properties. Panels thus produced withstood three days of humidity and immersion testing, temperature cycling between zero temperature and 650° F. without change in the 99% absorptivity and 25% emissivity values initially measured. A void-free coating was obtained.

A typical sequence of providing the coating was as follows:

60 seconds strike from tartrate bath at 10 asf. 60° C.
2 minute additional plate from above at 4 asf. (a step which can be omitted in favor of additional one-minute plating as 10 asf)
4 minute plate at 4 asf from a tartrate-free bath at room temperature, followed by thorough rinsing.

The first coating from a tartrate-containing bath also is an oxygen-deficient $PbO_2$.

The conditions in both baths were as follows:
The coating deposited on the anode:
pH = approx. 13.5
Copper plate cathodes
Workpiece was the anode
Vigorous agitation
Anode current densities as noted above The thickness of the coating after twenty minutes was 0.0003 in.

It was further found that the infrared emission within the oxygen-deficient $PbO_2$ film was further decreased by decreasing the thickness of the film. For example, by applying 0.00003 in. coating, the $\alpha/\epsilon$ ratio increased to 11.

The oxygen-deficient $PbO_2$ can be obtained in the ranges of $PbO_{1.66}$ to $PbO_{1.99}$, such as recognized in the paper "Electrical Properties of Electrodeposited $PbO_2$ Films" by W. Mindt, Journal Electro-Chemical Society, Vol. 116, No. 8, Pp. 1076–1080.

The bath composition to obtain oxygen-deficient $PbO_2$ can be varied, such as mentioned in U.S. Pat. Nos. 2,846,378; 2,872,405; 2,945,790; 2,945,791; 3,213,004; 3,453,707 and 3,634,216. As an example, a highly acidic bath in the foregoing example can not be used for plating on copper and a highly alkali bath of the other example can not be used on aluminum because of attack on the substrates. The article by Grigger et al., Journal Electro-Chemical Society, Vol. 5, No. 2, February, 1958, Pp. 100–102, and U.S. Pat. Nos. 2,872,405; 2,846,378; 1,595,675 and Re.18,030 are examples of a tartrate bath but none of these shows use in conjunction with solar collectors as described herein.

It should be apparent that details of the process and coating can be varied except as defined in the appended claims.

What is claimed is:

1. A solar energy collector system comprising a heat transfer member, a first electrodeposited coating from a tartrate-containing bath of semiconductor $PbO_2$ on said member, a second electrodeposited coating of semiconductor oxygen-deficient $PbO_2$ having a high $\alpha$ and low $\epsilon$ on said first coating, means feeding fluid into heat transfer relation to said member, and means for feeding fluid from said member to a zone of utilization.

2. A solar energy collector system as claimed in claim 1 wherein the tartrate is sodium potassium tartrate.

3. A solar energy collector system as claimed in claim 1 wherein the first coating is substantially void free.

4. A solar energy collector system as claimed in claim 1 wherein the second coating is from a non-tartrate bath.

5. A solar energy collector system as claimed in claim 1 wherein the second coating has an $\alpha$ of more than 90% and the $\epsilon$ is less than 15%.

6. A solar energy collector system as claimed in claim 1 wherein the first electrodeposited coating is deposited from a tartrate-containing bath maintained at a temperature in excess of 50° C.

* * * * *